May 19, 1931.                Z. L. CARD                1,806,446
                              GREASE CUP
                           Filed Aug. 5, 1927
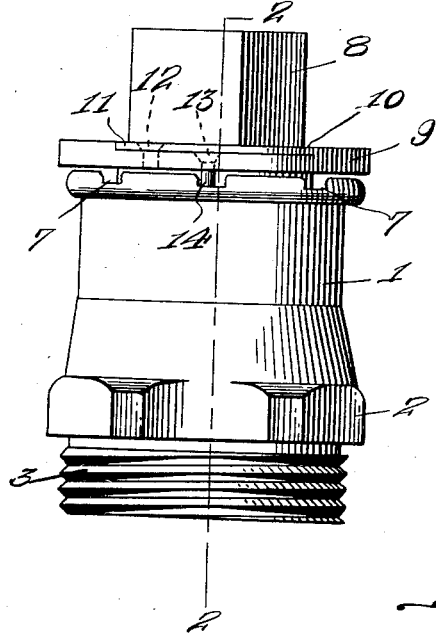
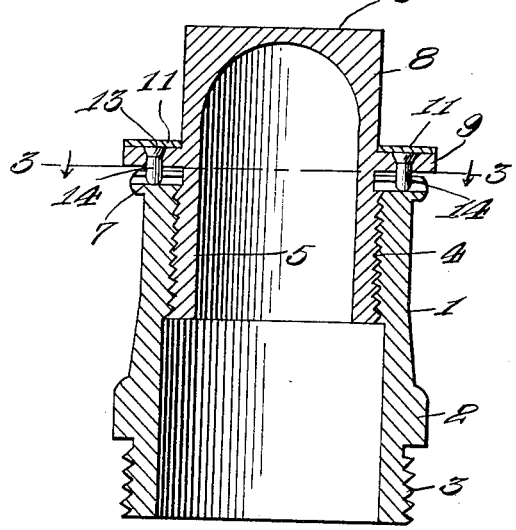
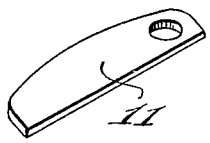
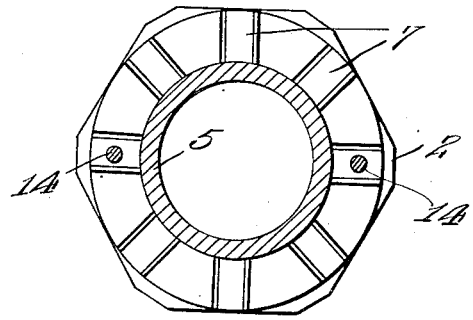
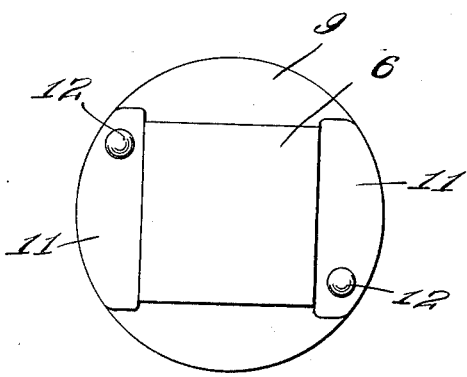
Zina L. Card,
INVENTOR
BY Victor J. Evans
ATTORNEY
WITNESS:

Patented May 19, 1931

1,806,446

UNITED STATES PATENT OFFICE

ZINA L. CARD, OF MILWAUKEE, WISCONSIN

GREASE CUP

Application filed August 5, 1927. Serial No. 210,952.

This invention relates to lubrication and its general object is to provide a grease cup having a plug which automatically locks itself to its body when secured thereto with the result the plug cannot be lost therefrom.

A further object of the invention is to provide a grease cup having a self locking plug that cannot become casually removed from its body but can be manually associated therewith or removed therefrom in an easy and expeditious manner with very little effort.

A further object of the invention is to provide a grease cup of the character as above set forth, that is extremely simple in construction and that is inexpensive to manufacture.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a side elevation of a grease cup forming the subject matter of the present invention.

Figure 2 is a sectional view taken approximately on line 2—2 of Figure 1.

Figure 3 is a sectional view taken on line 3—3 of Figure 2 looking in the direction of the arrows.

Figure 4 is a top plan view of the nut or plug for the grease cup.

Figure 5 is a detail view of one of the locking device springs.

Referring to the drawings in detail the reference numeral 1 indicates the body of my grease cup, which is of the usual construction and includes projections 2 extending outwardly from said body and merging therein to provide flat portions to accommodate a wrench or other like tool. The body is provided with an exteriorly threaded reduced lower end 3 whereby it can be threadedly associated with parts to be lubricated. An interiorly threaded portion 4 is formed with said body and is adapted to receive the threaded portion 5 of the plug 6.

The top of the body is flanged as shown and transversely formed on the upper surface of the body and flange thereof respectively is a plurality of radiating grooves 7 arranged in equi-distantly spaced relation with respect to each other as best shown in Figure 3 of the drawings and for a purpose which will be presently apparent.

The plug 6 is substantially hollow and includes a square wrench engaging head 8 and an outwardly extending annular flange 9 disposed between the head and threaded portion 5. The flange 9 is provided with opposed recesses 10 within each of which is disposed a leaf spring 11 secured at one end to the flange by a rivet or other like securing means 12. Arranged for slidable movement through the flange with their heads 13 countersunk therein and disposed in the recesses to be engaged by the free ends of the leaf springs 11 are locking studs 14 which project through the flange and have their rounded free ends extending beyond the inner face thereof as best shown in Figure 2, so that when the plug 6 is threaded in the body, it will be obvious that the studs will engage the upper surface of the body and naturally be positioned in two of the opposed grooves 7. When the locking studs 14 are arranged in their grooves 7, as shown in Figures 1, 2 and 3, it will be apparent that casual movement of the plug 6 will be prevented, as it is necessary that the locking studs be lifted from the grooves by manual rotation of the plug.

The leaf springs 11 have their outer edges curved to follow the curvature of the outer edge of the flange 9, and the inner edge of the springs are straight to conform to the shape of the walls of the head, as best shown in Figure 4 of the drawings.

From the above description and disclosure of the drawings, it will be obvious that the body of the cup can be filled with grease or other like lubricating material, and due to the fact that the plug is hollow, it can likewise be filled with grease and threadedly secured to the body with the locking studs 14 arranged in the grooves 7 as above set forth and clearly shown in Figures 1 and 2 of the drawings. While the plug can be manually rotated with the studs arranged in the grooves, due to the rounded ends of the studs, it will be apparent that the plug cannot be casually removed regardless of the vibration of the cup or the parts to which the same is secured.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A grease cup comprising a hollow body having a threaded portion, a flange formed with said body and together with the top of the body being provided with radiating grooves, a hollow plug threadedly received in said body, a flange formed with said plug and having opposed recesses in its top, leaf springs arranged in said recesses and having one of their ends secured, headed locking studs slidably mounted through the plug flange with the heads thereof countersunk and being engageable by the free ends of the leaf springs to normally retain the studs in the grooves, a wrench engaging head formed with said plug, projections formed with said body and presenting flat portions, and said springs having flat and rounded sides to conform to the shape of the plug flange and adjacent walls of the plug head respectively.

In testimony whereof I affix my signature.

ZINA L. CARD.